United States Patent
Justel et al.

(10) Patent No.: US 6,410,169 B1
(45) Date of Patent: *Jun. 25, 2002

(54) DISCHARGE LAMP

(75) Inventors: Thomas Justel; Herbert F. Borner; Hans Nikol, all of Aachen; Wolfgang Busselt, Roetgen, all of (DE)

(73) Assignee: Koninklijke Philips Electronics N.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,752

(22) Filed: Nov. 17, 1999

(30) Foreign Application Priority Data

Nov. 26, 1998 (EP) .............................. 98203996

(51) Int. Cl.$^7$ ........................... H05B 33/14; H01J 61/00
(52) U.S. Cl. ...................... 428/690; 428/917; 428/704; 313/503; 313/504; 313/463; 313/484; 313/486; 313/501; 313/636; 313/639

(58) Field of Search ................................. 428/690, 917, 428/704; 313/503, 504, 463, 484, 501, 636, 639, 486

(56) References Cited

U.S. PATENT DOCUMENTS

| | | | |
|---|---|---|---|
| 4,176,294 A | 11/1979 | Thornton, Jr. .............. | 313/485 |
| 5,756,224 A | * 5/1998 | Borner et al. ............... | 428/690 |
| 6,165,631 A | * 12/2000 | Boerner et al. ............. | 428/690 |

* cited by examiner

*Primary Examiner*—Cynthia H. Kelly
*Assistant Examiner*—Ling Xu
(74) *Attorney, Agent, or Firm*—Dicran Halajian

(57) ABSTRACT

In the luminescent screen of a flourescent lamp an organic europium compound is incorporated for converting mercury radiation between 350 nm and 450 nm into red light. The organic europium compound is diluted in an organic polymer. When the fluorescent lamp is dimmed its colour point shifts into the red similar to incandescent lamps and not into the blue.

8 Claims, 3 Drawing Sheets

DISCHARGE LAMP

BACKGROUND OF THE INVENTION

The invention relates to a discharge lamp equipped with
- a gastight lamp vessel transparent for visible radiation filled with at least one gas and mercury for generating ultraviolet radiation during operation of the discharge lamp,
- a luminescent screen comprising luminescent substances for converting the ultraviolet radiation into visible radiation.

The invention also relates to a compact fluorescent lighting arrangement.

A discharge lamp as mentioned in the opening paragraph is known for instance from U.S. Pat. No. 4,176,294. These so called fluorescent lamps are used on a very large scale in a wide variety of lighting applications. In many of these applications it is desirable for a user of the discharge lamp to be able to control its light output. In practice control of the light output of the lamp can for instance be realized by controlling the amplitude of the applied voltage that during operation is present over the series arrangement of the ballasting element and the discharge lamp. Control of this applied voltage can be realized making use of a phase cut dimmer. Alternatively, in case the discharge lamp is operated by means of an electronic ballast, the light output can also be decreased by changing the operating frequency of the electronic ballast. In both cases a decrease in light output is accompanied by an increase of the electrode temperature and thus also the electron temperature of the mercury plasma in the discharge lamp rises. This in turn results in an increased amount of mercury emission between 350 nm and 450 nm. In other words, in case the light output of the discharge lamp is decreased, the emission of mercury in the blue region of the spectrum is increased, causing a colour point shift into the blue. In contrast to this, incandescent lamps behave like black body emitters. That means that if the average amplitude of the applied voltage, that is present between the ends of the glow spiral is decreased (for instance by making use of a phase cut dimmer), the light output is decreased and the colour point of the emitted light becomes more reddish while the colour temperature is lowered. Generally the colour point shift into the red of incandescent lamps when the light output of such a lamp is decreased is appreciated as more pleasant by a user of the lamp than is the colour point shift into the blue associated with the decrease in light output of a discharge lamp of the fluorescent type.

The invention aims to provide a discharge lamp that, when its light output is decreased, shows a colour point shift into the red.

SUMMARY OF THE INVENTION

A discharge lamp as mentioned in the opening paragraph is therefore according to the invention characterized in that the luminescent screen comprises an organic $Eu^{3+}$ coordination compound for converting the mercury emissions between 350 nm and 450 nm into red light.

In case the light output of a discharge lamp according to the invention is decreased, the mercury emissions between 350 nm and 450 nm will increase. However, a substantial part of these mercury emissions will be converted into red light by the organic $Eu^{3+}$ coordination compound. As a result, the colour point of a discharge lamp according to the invention shifts into the red in a way that is similar to the colour point shift of an incandescent lamp. The colour point shift into the red is appreciated as more pleasant by users of the discharge lamp than is a colour point shift into the blue.

Preferably, to prevent degradation, the organic $Eu^{3+}$ coordination compound being diluted in an organic polymer that is transparent for radiation with a wavelength higher 350 nm. It has been found that the organic polymer can conveniently be incorporated into the luminescent screen in the form of a coating on an inner wall or an outer wall of the lamp vessel. Similarly the coating can be applied to the inner surface of a bulb that surrounds the discharge vessel.

Polymethylmethacrylate has been found to be a very suitable organic polymer to be used in a discharge lamp according to the invention.

Good results have been obtained for discharge lamps according to the invention, wherein the organic $Eu^{3+}$ coordination compound comprises a compound of general formula $Eu(diketonate)_3(diimin)$ and wherein the diketonate anion is chosen from the group formed by 4,4,4-trifluor-1-(2-thenoyl)-1,3-butanedione, 4,4,4-trifluor-1-(2-naphthyl)-1,3-butanedione, dibenzoylmethane, benzophenone-4-acetylacetonate (and derivatives in which part of the hydrogens are substituted by methyl groups) and acetophenone-4-acetylacetonate (and derivatives in which part of the hydrogens are substituted by methyl groups) and the diimin is chosen from the group formed by phenanthroline, diphenylphenanthroline and 2,2'-bipyridine.

Good results have also been obtained for discharge lamps according to the invention, wherein the organic $Eu^{3+}$ coordination compound comprises a compound of general formula $Eu(R\text{---}COO)_3(triphenylphosphinoxide)_2$ and wherein $R\text{---}COO$ is a carboxylate anion chosen from the group formed by benzophenone-4-carboxylic acid and acetophenone-4-carboxylic acid and their derivatives in which part of the hydrogen is substituted by methyl groups.

A discharge lamp according to the invention is very suitable to be used in a compact fluorescent lighting arrangement comprising a discharge lamp and equipped with
- a housing connected to the discharge lamp,
- a lamp socket connected to the housing and comprising electrical contacts, and
- a ballast circuit comprised in the housing and coupled to the discharge vessel and to the electrical contacts. Since the diameter of the lamp vessel in the compact fluorescent lighting arrangement is relatively narrow, a decrease in light output of the discharge lamp is accompanied by a relatively large colour point shift. The use of a discharge lamp according to the invention makes sure that the colour point is shifted into the red and not into the blue as a result of this decrease in lamp voltage.

DETAILED DESCRIPTION OF THE PREFERRED EMBODIMENTS

Figure 1A:
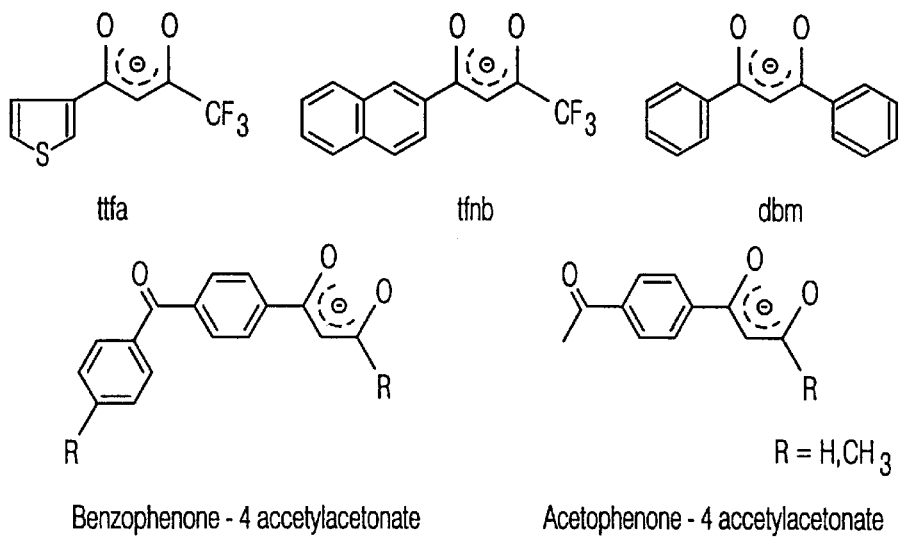
FIGS. 1a, 1b, 2a and 2b each show organic ligands that can be present in the organic $Eu^{3+}$ coordination compound that is used in the luminescent screen of a discharge lamp according to the invention.
Figure 1B:
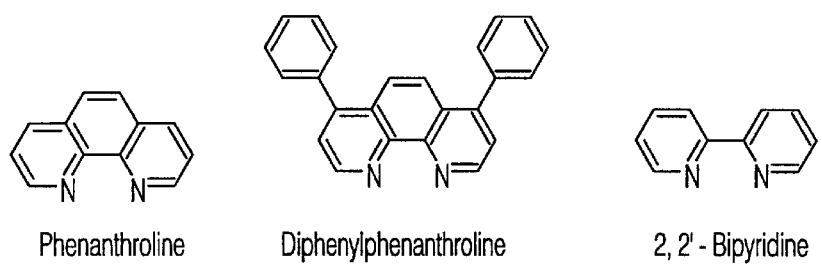

FIG. 1a and FIG. 1b show diketonate ligands and diimine ligands respectively that can be used in an organic $Eu^{3+}$ coordination compound of general formula Eu(diketonate)$_3$(diimin). FIG. 1a shows 4,4,4-trifluor-1-(2-thenoyl)-1,3-butanedione (ttfa), 4,4,4-trifluor-1-(2-naphthyl)-1,3-butanedione (tfnb), dibenzoylmethane (dbm), benzophenone-4-acetylacetonate and acetophenone-4-acetylacetonate and/or derivatives of the latter two, in case the substituent —R is chosen as a methyl group instead of as a hydrogen. FIG. 1b respectively shows phenanthroline, diphenylphenanthroline and 2,2'-bipyridine.

Figure 2A:
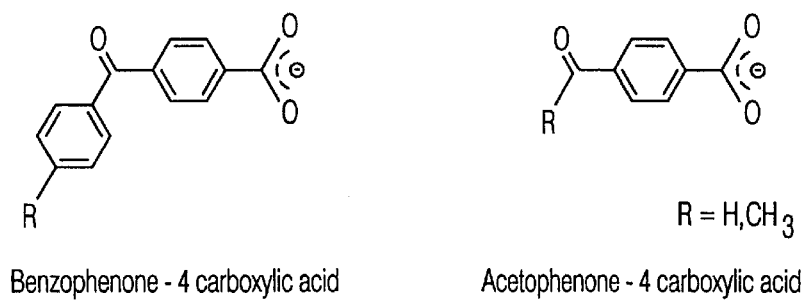
Figure 2B:
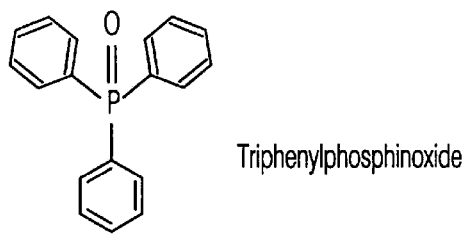

FIG. 2a and FIG. 2b show carboxylate ligands and the ligand triphenylphosphinoxide respectively that can be used in an organic Eu$^{3+}$ coordination compound of general formula Eu(R—COO)$_3$(triphenylphosphinoxide)$_2$. FIG. 2a shows the carboxylate ions benzophenone-4-carboxylic acid and acetophenone-4-carboxylic acid and their derivatives in which part of the hydrogen is substituted by methyl groups.

Figure 3:
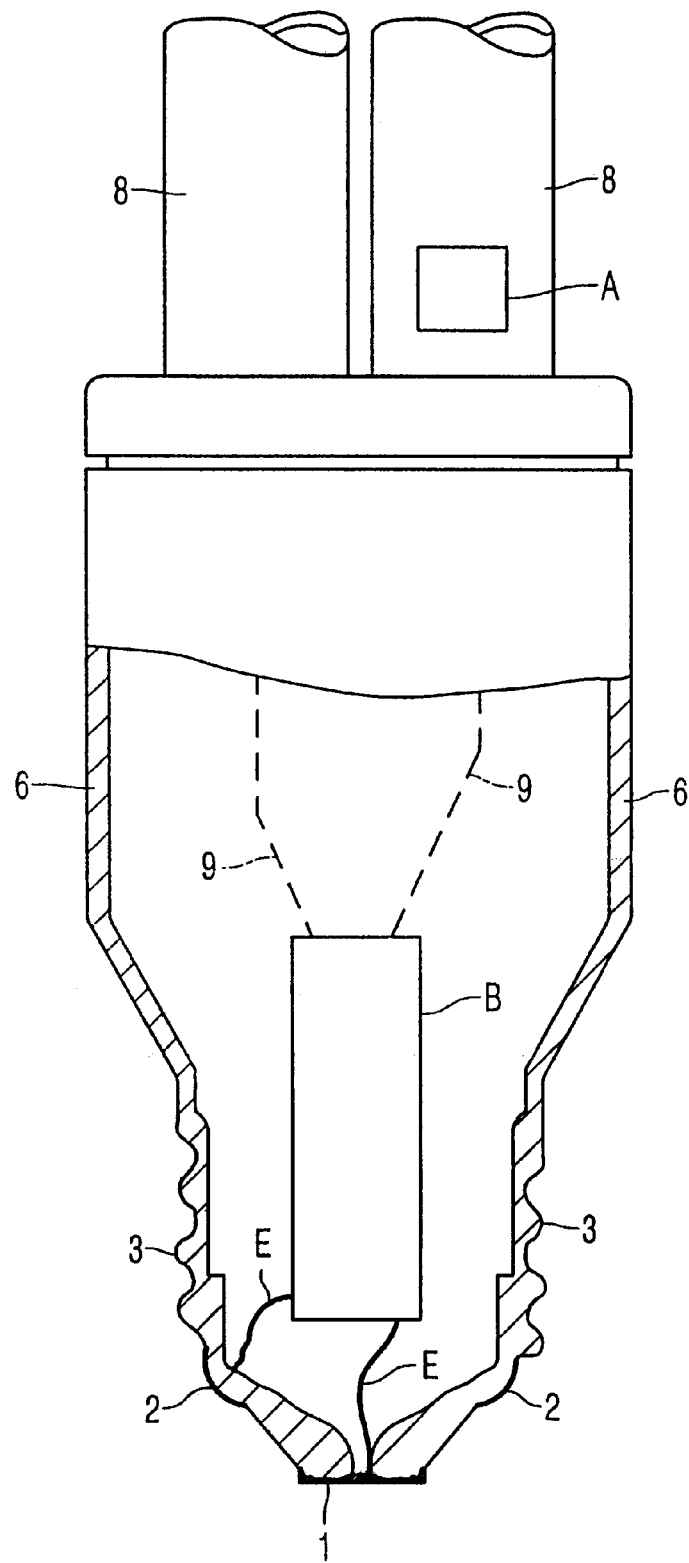
FIG. 3 shows a compact fluorescent lighting arrangement according to the invention, and FIG. 4 and FIG. 5 respectively show the emission spectrum of a compact fluorescent lighting arrangement not according to the invention and the emission spectrum of a compact fluorescent lighting arrangement according to the invention.

In FIG. 3, a discharge lamp 8 includes a gastight lamp vessel transparent for visible radiation and filled with at least one gas and with mercury for generating ultraviolet radiation during operation of the discharge lamp. On a wall of the lamp vessel is a luminescent screen A for converting the ultraviolet radiation into visible radiation. The luminescent screen comprises an organic Eu$^{3+}$ coordination compound for converting the mercury emissions between 350 nm and 450 nm into red light, said organic Eu$^{3+}$ coordination compound being diluted in an organic polymer. The organic polymer is present as coating on the inside wall of the lamp vessel, the remaining components of the luminescent screen are present in a luminescent layer on the coating. 6 is a housing connected to the discharge lamp. 3 is a lamp socket equipped with electrical contacts (1, 2) and connected to the housing. B is a schematic representation of a ballast circuit coupled to the contacts 1 and 2 by means of connecting wires E and to the discharge lamp 8 by means of connecting wires 9.

The operation of the compact fluorescent lighting arrangement shown in FIG. 3 is as follows. When the contacts 1 and 2 are connected to the poles of a supply voltage source the ballast circuit B generates a lamp current out of a supply voltage delivered by the supply voltage source. In case the discharge lamp is dimmed by means of dimming means not shown in FIG. 3, the light output drops and the emission of radiation between 350 nm and 450 nm by the mercury present in the discharge vessel increases. This radiation between 350 nm and 450 nm, however, is effectively converted into red light by means of the organic Eu$^{3+}$ coordination compound. As a result the decrease of the light output of the discharge lamp is accompanied by a a colour point shift into the red. This colour point shift is similar to the one of an incandescent lamp that is dimmed and is generally preferred by users of the lamp above a colour point shift into the blue.

In a practical experiment 3.5 gram Eu(tfnb)$_3$(phen) and 25 gram polymethylmethacrylate were dissolved in 100 ml of acetone. 10 ml of this solution is brought into a lamp bulb in order to coat its inner glass wall. After that, the solution was slowly removed by a pipette and thus a thin film of the polymer remains on the surface of the glass bulb. This polymer film was dried by applying an air flow.

Figure 4:
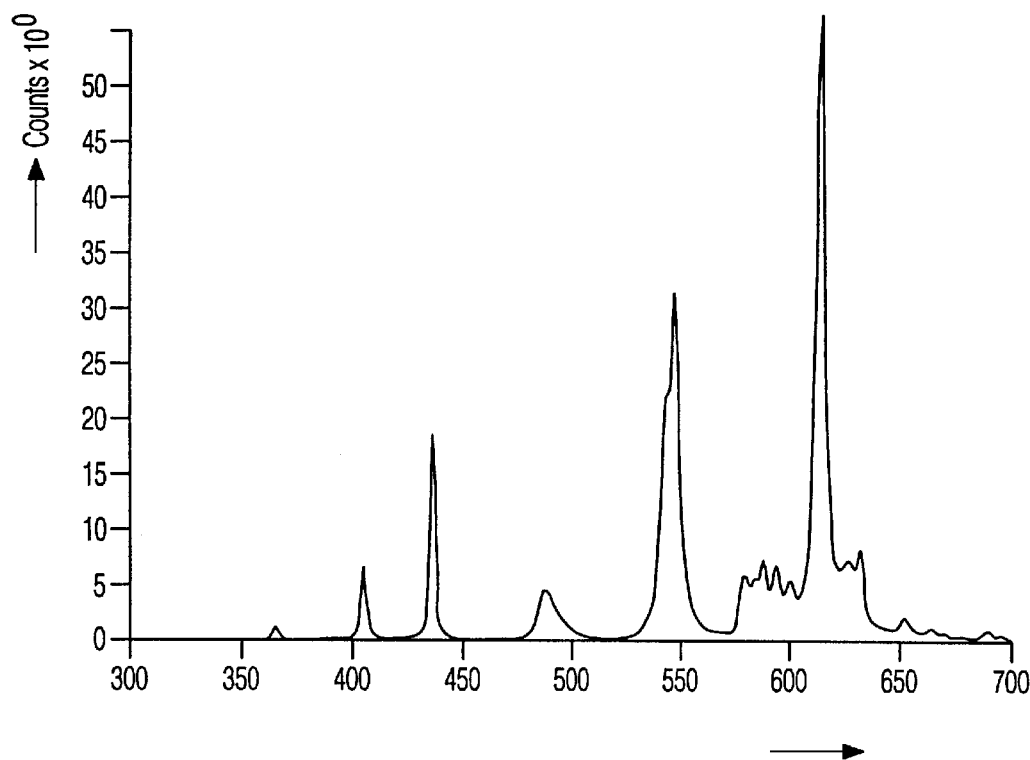
Figure 5:
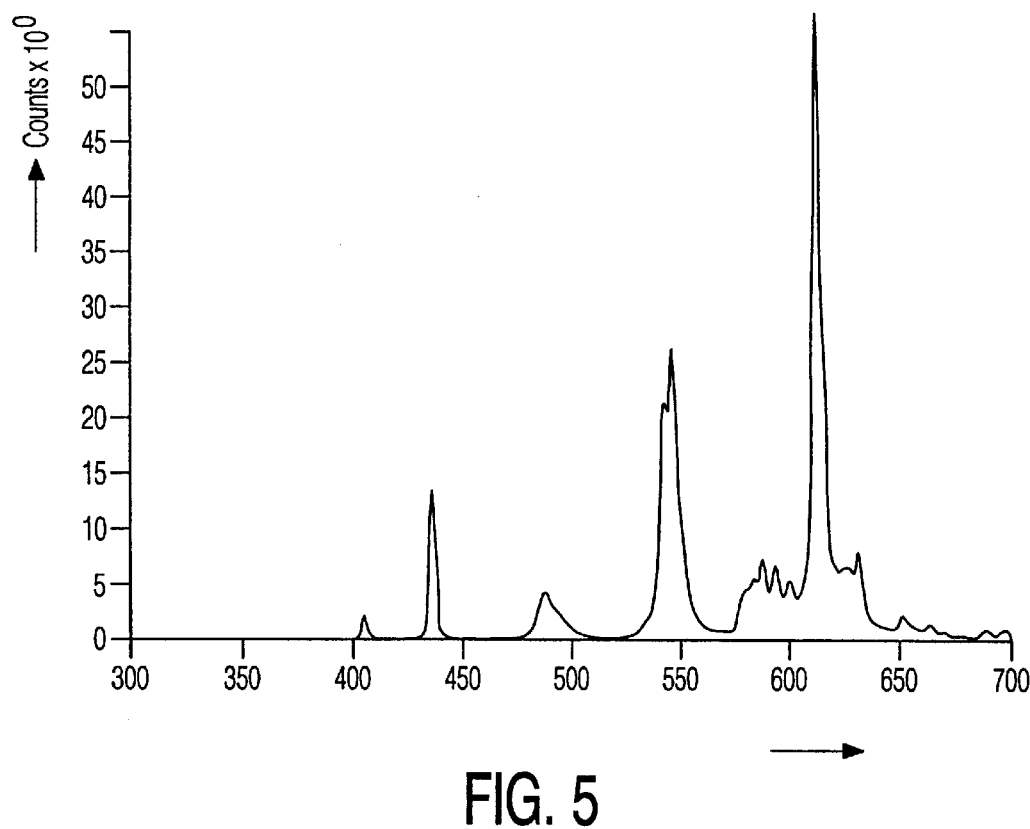

In FIG. 4 and FIG. 5 wavelength in nm is plotted along the horizontal axis. The intensity of the emitted radiation is plotted along the vertical axis. FIG. 4 and FIG. 5 show respectively the emission spectrum of a regular 9 Watt PLC-E lamp and a 9 Watt PLC-E lamp having a coated glass bulb described in the preceding paragraph placed over the discharge vessel of the lamp. In this lamp the luminescent screen is formed by the luminescent layer comprised in the lamp vessel of the PLC-E lamp and the coating present on the inner glass wall of the bulb. It can be seen that the radiation with a wavelength between 350 nm and 450 nm has a relative low intensity for the 9 Watt PLC-E lamp having a coated glass bulb.

What is claimed is:

1. Discharged lamp equipped with
   a gastight lamp vessel transparent for visible radiation filled with at least one gas and mercury for generating ultraviolet radiation during operation of the discharge lamp, and
   a luminescent screen comprising an organic Eu$^{3+}$ coordination compound configured to convert ultraviolet radiation having a wavelength between 350 nm and 450 nm into red light.

2. Discharge lamp according to claim 1, wherein said organic Eu$^{3+}$ coordination compound is diluted in an organic polymer that is transparent for radiation with a wavelength higher than 350 nm.

3. Discharge lamp according to claim 2, wherein the organic polymer is deposited from a solvent solution and coats all or part of an inner wall or an outer wall of the lamp vessel.

4. Discharge lamp according to claim 2, wherein the organic polymer is polymethylmethacrylate.

5. Discharge lamp according to claim 1, wherein the organic Eu$^{3+}$ coordination compound comprises a compound of general formula Eu(diketonate)$_3$(diimin) and wherein the diketonate anion is chosen from the group formed by 4,4,4-trifluor-1-(2-thenoyl)-1,3-butanedione, 4,4,4-trifluor-1-(2-naphthyl)-1,3-butanedione, dibenzoylmethane, benzophenone-4-acetylacetonate (and its derivatives in which part of the hydrogens are substituted by methyl groups) and acetophenone-4-acetylacetonate (and its derivatives in which part of the hydrogens are substituted by methyl groups) and the diimin is chosen from the group formed by phenanthroline, diphenylphenanthroline and 2,2'-bipyridine.

6. Discharge lamp according to claim 1, wherein the organic EU$^{3+}$ coordination compound comprises a compound of general formula Eu(R—COO)$_3$(triphenylphosphinoxide)$_2$ and wherein R—COO is a carboxylate anion chosen from the group formed by benzophenone-4-carboxylic acid and acetophenone-4-carboxylic acid and their derivatives in which part of the hydrogen is substituted by methyl groups.

7. Compact fluorescent lighting arrangement comprising
   a discharge lamp equipped with a gastight lamp vessel transparent to visible radiation, said vessel being filled with at least one gas and mercury for generating ultraviolet radiation dring operation of the lamp, said vessel having an inside wall provided with a luminescent screen comprising an organic Eu$^{3+}$ coordination compound configured to convert ultraviolet radiation having a wavelength between 350 nm and 450 nm into red light,
   a housing connected to said lamp vessel,
   a lamp socket connected to said housing and said socket comprising electrical contacts, and
   a ballast circuit comprised in said housing and coupled to said lamp vessel and to the electrical contacts.

8. Compact fluorescent lighting arrangement comprising
   a discharge lamp equipped with a gastight lamp vessel transparent to visible radiation, said vessel being filled with at least one gas and mercury for generating ultraviolet radiation during operation of the lamp, said vessel having an inside wall provided with a luminescent screen comprising an organic $Eu^{3+}$ coordination compound means for converting ultraviolet radiation between 350 nm and 450 nm into red light, a housing connected to said lamp vessel, a lamp socket connected to said housing and said socket comprising electrical contacts, and a ballast circuit comprised in said housing and coupled to said lamp vessel and to the electrical contacts.

* * * * *